United States Patent [19]
Katoh et al.

[11] Patent Number: 5,625,413
[45] Date of Patent: Apr. 29, 1997

[54] VIDEO CAMERA WITH A FUNCTION TO CORRECT DEFECTIVE PIXELS OF SOLID STATE IMAGE PICKUP DEVICE AND METHOD OF CORRECTING DEFECTIVE PIXELS OF SOLID STATE IMAGE

[75] Inventors: Minoru Katoh; Kenji Itoh, both of Katsuta; Hiroyasu Ohtsubo, Yokohama, all of Japan

[73] Assignee: Hitachi, Ltd., Tokyo, Japan

[21] Appl. No.: 470,010

[22] Filed: Jun. 6, 1995

Related U.S. Application Data

[63] Continuation of Ser. No. 249,286, May 25, 1994, abandoned.

[30] Foreign Application Priority Data

Jun. 2, 1993 [JP] Japan ................................ 5-132169

[51] Int. Cl.$^6$ ............................................. H04N 9/64
[52] U.S. Cl. ........................................ 348/246; 348/243
[58] Field of Search ................................ 348/246, 243, 348/247, 229, 363, 616, 241, 242, 245, 607; 358/461, 471

[56] References Cited

U.S. PATENT DOCUMENTS

| | | | |
|---|---|---|---|
| 4,279,510 | 7/1981 | Brown | 356/319 |
| 4,410,915 | 10/1983 | Yamamoto | 348/363 |
| 4,481,539 | 11/1984 | Meise et al. | 348/247 |
| 4,654,714 | 3/1987 | Hurst, Jr. et al. | 348/247 |
| 5,008,757 | 4/1991 | Kimura et al. | 348/229 |
| 5,047,861 | 9/1991 | Houchin et al. | 348/247 |
| 5,047,863 | 9/1991 | Pape et al. | 348/247 |
| 5,144,446 | 9/1992 | Sudo et al. | 348/246 |
| 5,272,536 | 12/1993 | Sudo et al. | 348/243 |
| 5,416,516 | 5/1995 | Kameyama et al. | 348/246 |

FOREIGN PATENT DOCUMENTS

| | | | |
|---|---|---|---|
| 0313278 | 4/1989 | European Pat. Off. | H04N 5/217 |
| 0458030 | 11/1991 | European Pat. Off. | H04N 5/217 |
| 3629009 | 3/1988 | Germany | H04N 5/217 |
| 3236689 | 10/1991 | Japan | H04N 5/335 |

OTHER PUBLICATIONS

"Video Signal Processing LSI"—The Transactions of the Institute of Television Engineers of Japan, vol. 48 No. 1 pp. 20–24 1994.

*Primary Examiner*—John K. Peng
*Assistant Examiner*—Andrew B. Christensen
*Attorney, Agent, or Firm*—Antonelli, Terry, Stout & Kraus, LLP

[57] ABSTRACT

When defective pixels of a solid state image pickup device of a video camera are corrected by signal processes, a white spot noise is detected by closing an iris and by comparing the signal level and a level of only a dark current. Further, in this case, a gain of an AGC circuit for controlling a gain of a video signal is raised and a precise detection is executed. By executing such a detecting operation at the time of turn-on or turn-off of a power source, the user is not annoying. In the ordinary photographing, a reference level in detection of a white spot noise is set to an optimum value in accordance with a temperature of the solid state image pickup device or its peripheral temperature or the gain of the AGC circuit so that the white spot noise detection is not influenced by the temperature of the solid state image pickup device or the operating state of the AGC circuit.

15 Claims, 10 Drawing Sheets

FIG. 3
| A₁₁ | B₁₁ | A₁₂ | B₁₂ | A₁₃ | B₁₃ |
|-----|-----|-----|-----|-----|-----|
| C₁₁ | D₁₁ | C₁₂ | D₁₂ | C₁₃ | D₁₃ |
| A₂₁ | B₂₁ | A₂₂ | B₂₂ | A₂₃ | B₂₃ |
| C₂₁ | D₂₁ | C₂₂ | D₂₂ | C₂₃ | D₂₃ |
FIG. 4
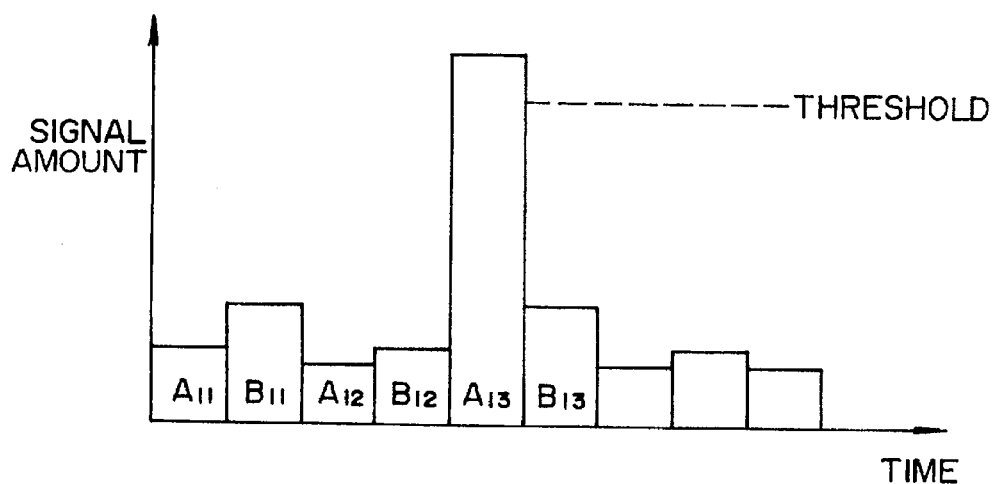
FIG. 5
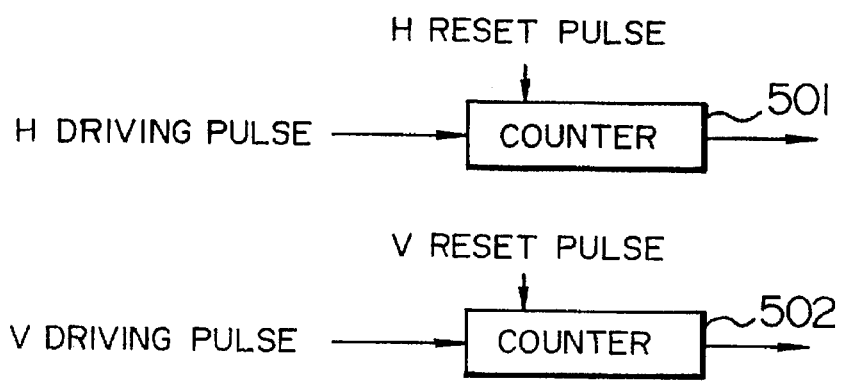

FIG. 6
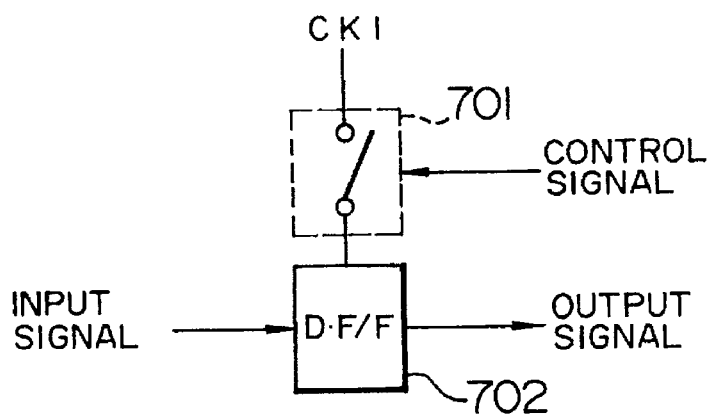
FIG. 7
FIG. 8A  CKI 
FIG. 8B  CONTROL PULSE 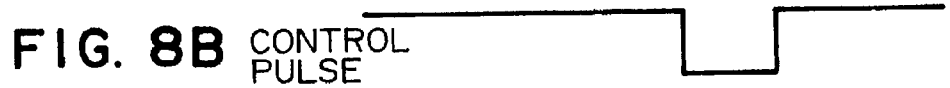
FIG. 8C  INPUT SIGNAL 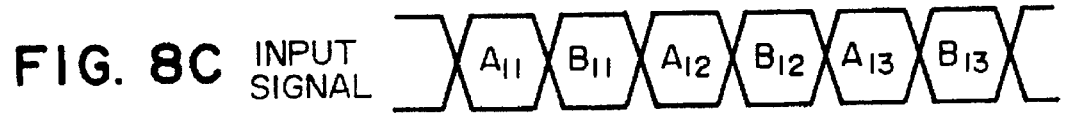
FIG. 8D  OUTPUT SIGNAL 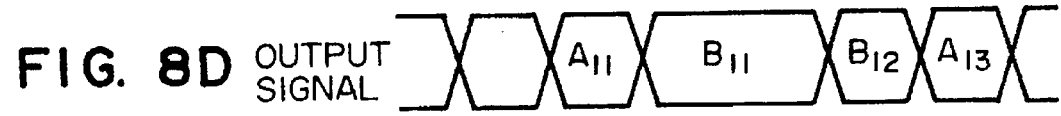

FIG. 11A  CK1
FIG. 11B  CONTROL SIGNAL
FIG. 11C  INPUT OF D·F/F 1001
FIG. 11D  OUTPUT OF D·F/F 1004
FIG. 11E  OUTPUT OF D·F/F 1003

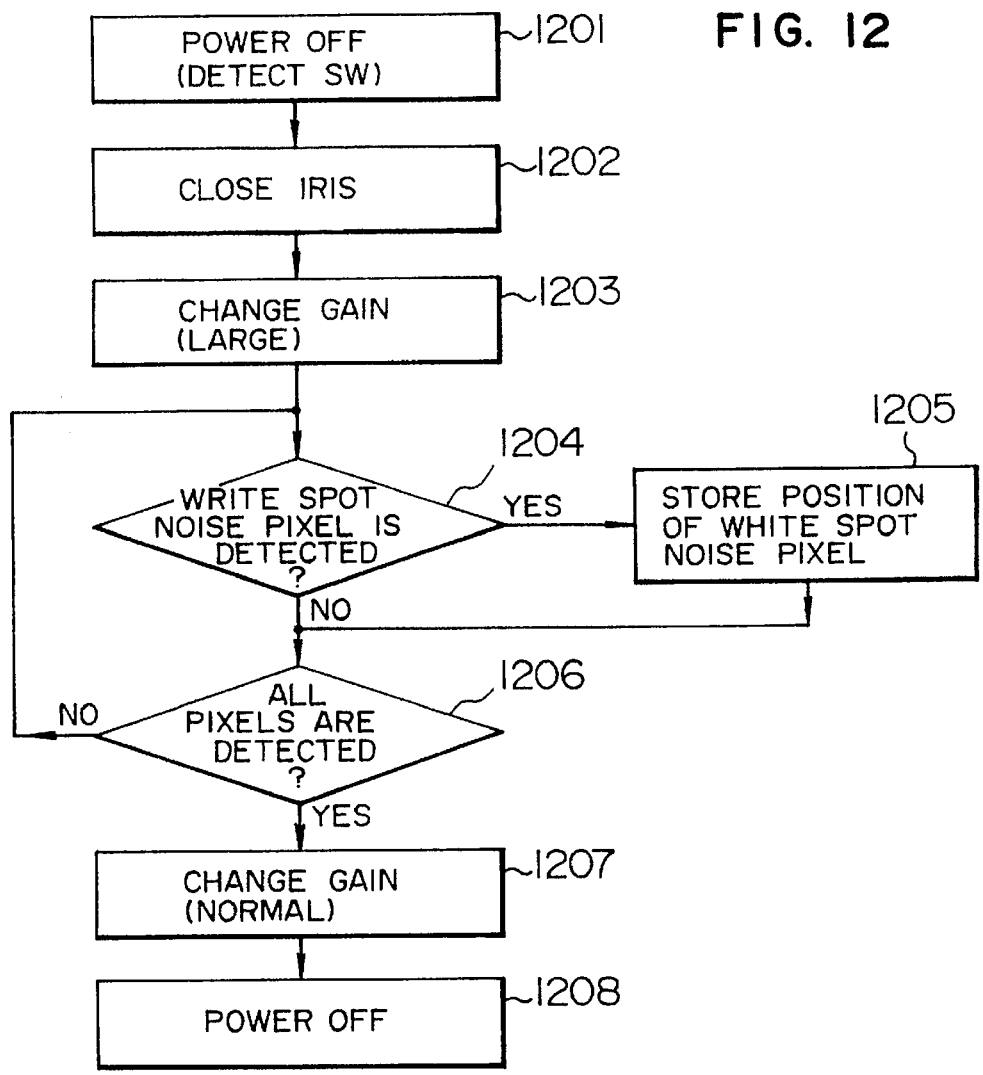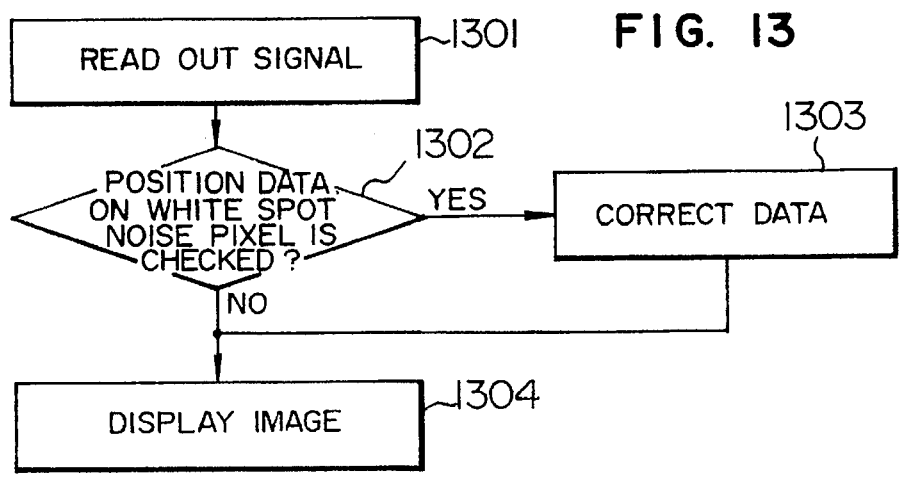

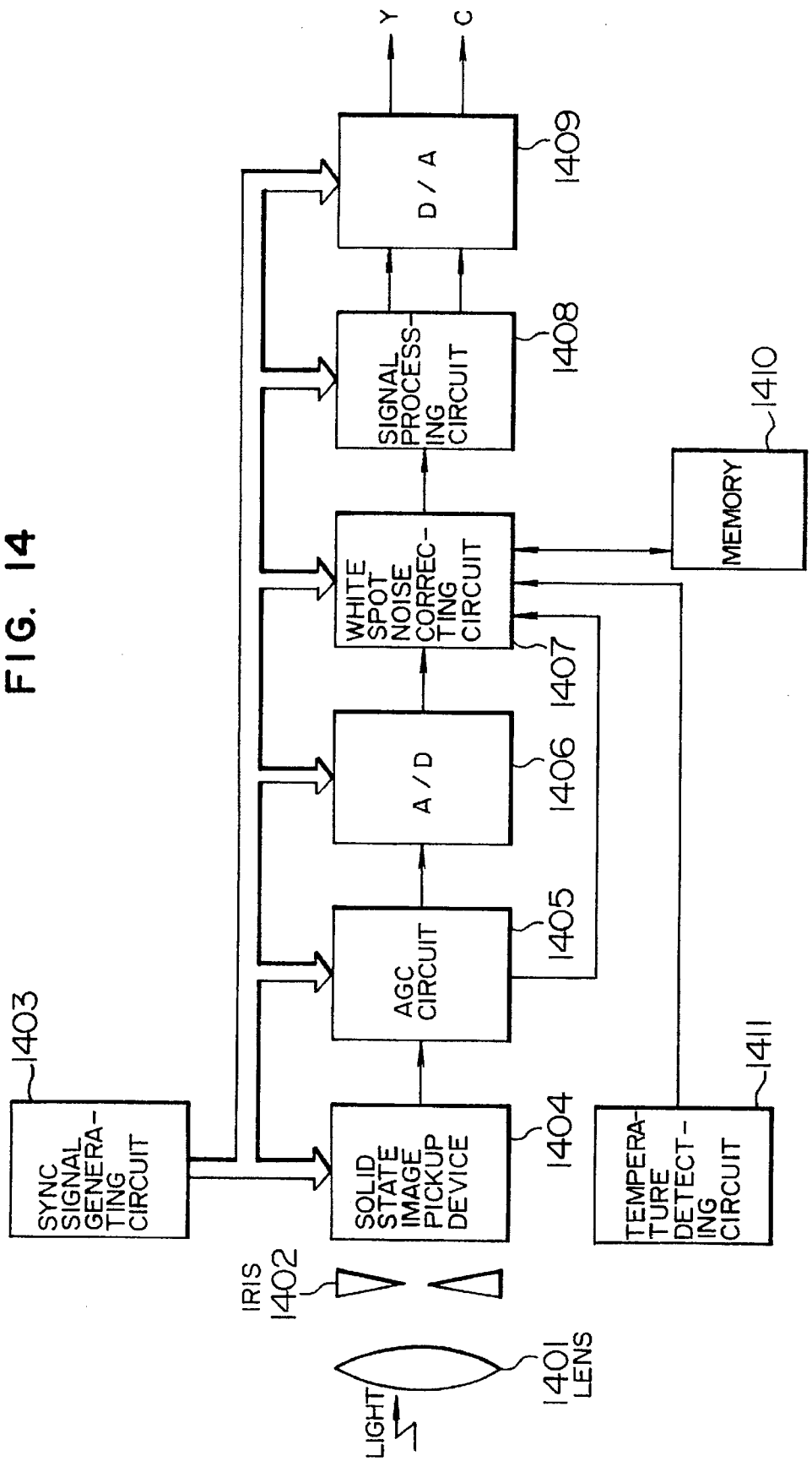

VIDEO CAMERA WITH A FUNCTION TO CORRECT DEFECTIVE PIXELS OF SOLID STATE IMAGE PICKUP DEVICE AND METHOD OF CORRECTING DEFECTIVE PIXELS OF SOLID STATE IMAGE

This application is a continuation application of Ser. No. 08/249,286, filed May 25, 1994, now abandoned.

BACKGROUND OF THE INVENTION

The invention relates to a video camera using a solid state image pickup device and, more particularly, to a function to correct defective pixels of a solid state image pickup device by signal processes.

As a conventional video camera having a function to correct defective pixels of a solid state image pickup device, for example, a video camera disclosed in JP-A-3-236689 can be mentioned. According to such a video camera, after an image signal obtained by the solid state image pickup device was converted into a digital signal, in order to correct an abnormal signal of an image, what is called a white spot noise, due to defective pixels, whether the level of the absolute value of an outline correction signal is equal to or larger than a predetermined value or not is discriminated by using an outline correction circuit, thereby automatically judging whether the pixels are defective pixels or not.

Although the solid state image pickup device converts an energy of light into an electric signal, it has a nature to also convert a thermal energy into an electric signal. The signal component which was converted into the electric signal by such a thermal energy is caused by a dark current. Since the dark current occurs by the thermal energy, a temperature dependency is strong and its value is almost doubled when the temperature rises by 10° C.

A white spot noise occurs when the dark current is abnormally increased as compared with the other pixels due to defective pixels. Therefore, the signal level of the white spot noise has a temperature dependency. Since the video camera executes an automatic gain control (AGC), when an object is dark, a gain of circuit system is raised, thereby keeping a brightness of a video image constant. Thus, the level of white spot noise is also changed by the gain of the AGC. Further, since a change similarly occurs with regard to the normal signal component, it is very difficult to detect the white spot noise in the ordinary photographing state. In the above literature, however, a judgment reference of the white spot noise is merely set to a predetermined value, so that no consideration is made in the conventional video camera with respect to a point that the white spot noise due to defective pixels is detected at a high precision.

Reference may further be made to U.S. Pat. No. 4,654,714 which relates to correction of white spot noise.

SUMMARY OF THE INVENTION

It is the first object of the present invention that a white spot noise due to defective pixels of a solid state image pickup device is detected at a high precision by a video camera iself and the correction of the white spot noise based on it is satisfactorily executed.

To accomplish the above object, according to a video camera of the invention, when the defective pixels of the solid state image pickup device is corrected by a signal process, the white spot noise is detected in a closed state of an iris. Therefore, the level comparison can be performed by only the signal due to the dark current and an influence by the object is eliminated. In the above detection, when a gain of an AGC circuit to perform a gain control of a video signal is raised, the white spot noise can be more precisely detected. By executing such a detecting operation at the time of power-on or power-off, the user is not inconvenienced or annoyed.

The second object of the invention is to accurately detect a white spot noise due to defective pixels of a solid state image pickup device during the photographing operation and to preferably correct the white spot noise based on it.

To accomplish the above object, according to a video camera of the present invention, when the defective pixels of the solid state image pickup device are corrected by signal processes, a threshold level for judgment of the white spot noise is set to an optimum value in accordance with a temperature of the solid state image pickup device or its peripheral portion or with the gain of the AGC circuit and the white spot noise is detected by using such a level. For example, when the temperature rises by 10° C., the threshold level for judgment of the white spot noise is doubled. When the temperature drops by 10° C., the threshold level is reduced into ½. When the gain of the AGC circuit is doubled, the threshold level for judgment of the white spot noise is doubled. When the gain of the AGC circuit is reduced into ½, the threshold level is reduced into ½. Therefore, the detection of the white noise is not influenced by the temperature of the solid state image pickup device or by the operating state of the AGC circuit. In a state in which the gain of the AGC circuit rises, the object is in an enough dark state. Therefore, a specific high luminance signal of one pixel can be judged as a white spot noise.

Thus, according to the present invention, detection of white spot noise due to defective pixels of a solid state image pickup device and correction based on such detection can be performed at a high precision by the video camera itself.

BRIEF DESCRIPTION OF THE DRAWINGS

The present invention will be more apparent from the following detailed description, when taken in conjunction with the accompanying drawings, in which:

FIG. 3 is an explanatory diagram showing an arrangement of color filters of a solid state image pickup device;

FIG. 4 is an explanatory diagram showing an example of a dark current output of the solid state image pickup device;

FIG. 5 is a block diagram of a circuit for detecting position information of pixels at which a signal is read out from the solid state image pickup device in the first embodiment of the invention;

FIG. 6 is an explanatory diagram showing an arrangement of color filters of the solid state image pickup device and the signal reading-out operation;

FIG. 7 is a block diagram of a circuit to perform a signal replacement for a white spot noise correction in the first embodiment of the invention;

FIGS. 8A to 8D are timing charts of the circuit of FIG. 7;

FIGS. 11A to 11E are timing charts of the circuit of FIG. 10;

FIG. 12 is a flowchart showing a flow of a white spot noise detecting process according to the second embodiment of the invention;

FIG. 13 is a flowchart showing a flow of a white spot noise correcting process according to the second embodiment of the invention;

FIG. 14 is a block diagram showing a construction of a main section of a video camera according to the third embodiment of the invention;

DESCRIPTION OF PREFERRED EMBODIMENTS

Embodiments of the present invention will now be described hereinbelow with reference to the drawings.

Figure 1:
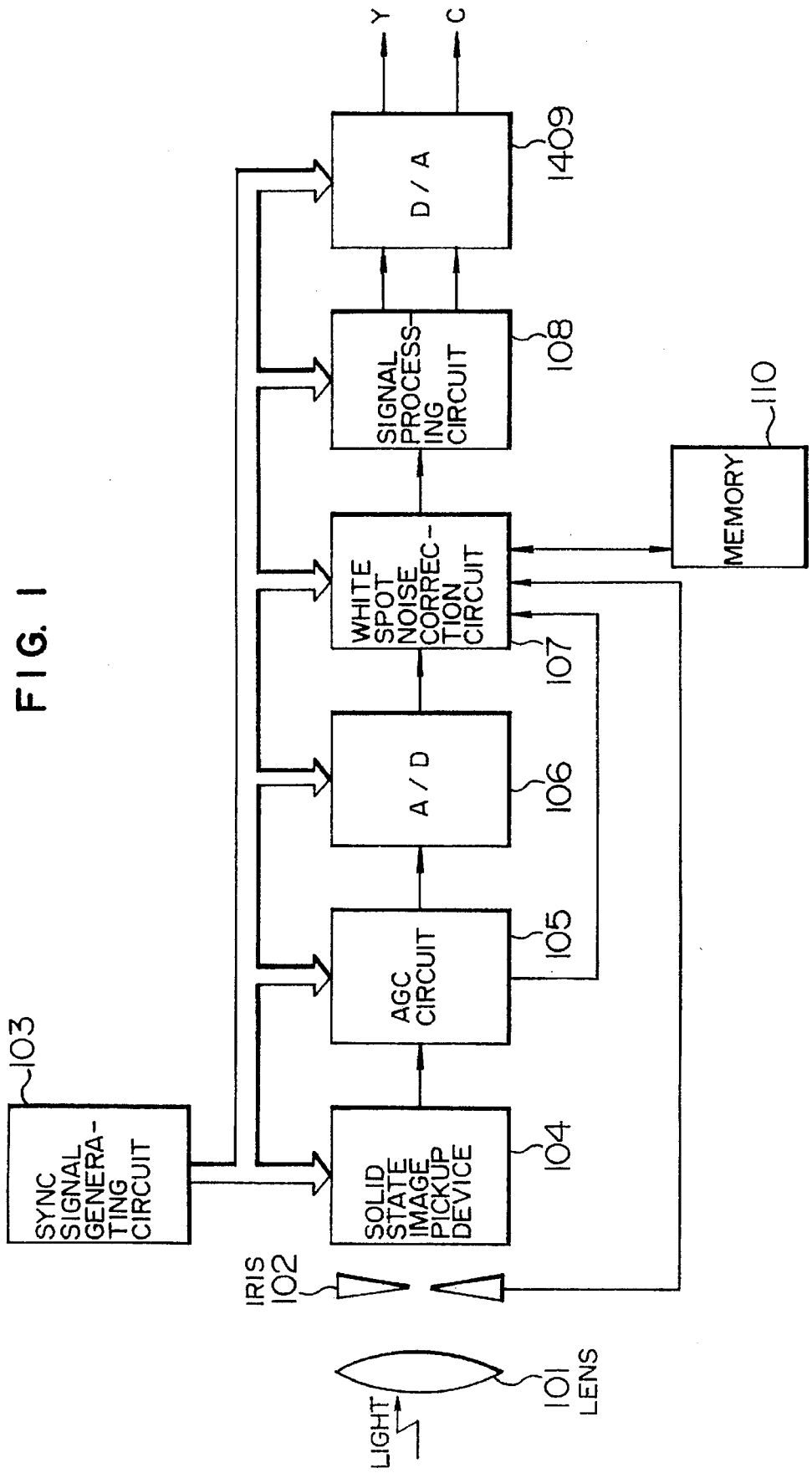
FIG. 1 is a block diagram showing a construction of a main section of a video camera according to the first embodiment of the present invention.

FIG. 1 is a block diagram showing a construction of a video camera according to the first embodiment of the invention. The video camera comprises: a lens 101; an iris 102; a sync signal generating circuit 103; a solid state image pickup device 104; an automatic gain control circuit (AGC circuit) 105; an analog/digital converting circuit (A/D converter) 106; a white spot noise correction circuit 107; a signal processing circuit 108; a digital/analog converting circuit (D/A converter) 109; and a memory 110. The light which enters from the lens 1 is converted into the electric signal by the solid state image pickup device 104. When the brightness of an object lies within a range where the AGC process is necessary, namely, when the luminance signal level doesn't reach a predetermined value in spite of the fact that the iris 102 is in a full-open state, the AGC circuit 105 amplifies the signal in accordance with the brightness of the object. The A/D converter 106 subsequently converts the amplified signal into a digital signal encompassing every pixel.

When a signal amount is less than a threshold level, the white spot correction circuit 107 regards that the signal is normal, so that the input digital signal is outputted as it is. When the signal amount is equal to or larger than the threshold level, the white spot noise correction circuit 107 executes a predetermined correcting process. The signal processing circuit 108 processes the digital signal in conformity with the standards of a video signal about the color separation, white balance, γ correction, and the like. The D/A converter 109 converts the input digital signal into the analog signal and generates a luminance signal Y and a chroma signal C.

A detecting operation of a white spot noise and a correcting operation based on the white spot noise detection in the white spot noise correction circuit 107 will now be described with reference to a flowchart of FIG. 2 and FIGS. 3 to 11. In the embodiment, the white spot noise is detected for a period of time until a picture image is displayed after the turn-on of a power source.

Figure 2:
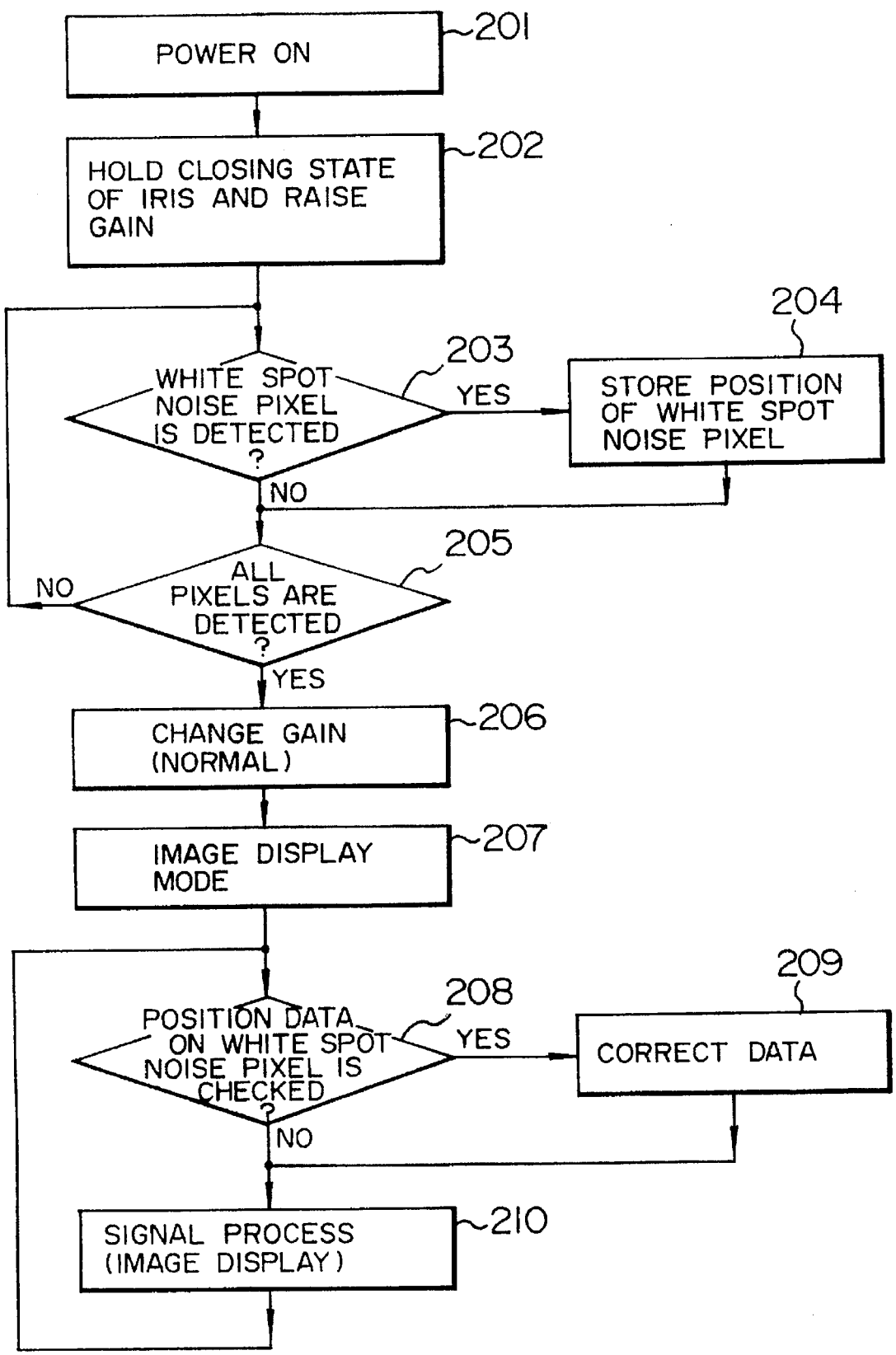
FIG. 2 is a flowchart showing flows of a white spot noise detecting process and a white spot noise correcting process according to the first embodiment of the invention.

As shown in FIG. 2, the white spot noise correction circuit 107 continuously allows the iris 102 to be closed after the turn-on of the power source (step 201), thereby preventing that a photosignal enters the solid state image pickup device 104 and also a gain of the AGC circuit 105 is raised to make it easy to detect the white spot noise (202). In the embodiment, since the white spot noise is detected by the digital signal, in order to also reduce a quantization error in association with the digitization, it is necessary to perform the amplifying process by the analog signal system before the A/D conversion is executed. It is also possible to prepare a gain setting mode which is used only for detection of the white spot noise and to set so that a gain in the gain setting mode only for use in the white spot noise detection exceeds a gain variable width (i.e., an object imaging gain range) of the ordinary operation.

In the above state (iris closing state and high gain state), the signal from each pixel of the solid state image pickup device 104 is read out synchronously with a pulse which is generated from the sync signal generating circuit 103. FIG. 3 shows an example of an arrangement of color filters of the solid state image pickup device 104. The color filters are constructed by filters of four colors of A, B, C, and D. Chrominance signals according to the color filters are respectively read out synchronously with horizontal and vertical driving pulses which are generated from the sync signal generating circuit 103. Since the iris 102 is closed, however, the output from the solid state image pickup device 104 is constructed by only the fore-going dark current. FIG. 4 shows an example of such a dark current. Although there is not so large variation in the dark current amount of each normal pixel, the dark current of a very large level such as $A_{13}$ is derived from the defective pixel. Such a state is referred to as a white spot noise. The white spot noise correction circuit 107 executes a comparison on the basis of a certain threshold level (203). The position information on the pixel which produces the signal of a level higher than the threshold level is stored into the memory 110 as white spot noise pixel position information (204).

As for the position information, for example, such a position can be known by counting the horizontal and vertical driving pulses. FIG. 5 is a block diagram of a circuit to detect the position information. The horizontal position information is obtained by counting the horizontal (H) driving pulses by a counter 501 and by storing the count value of the counter at a time point when the pixel is judged as a white spot noise pixel into the memory 110. The vertical position information is obtained by counting the vertical (V) driving pulses by a counter 502 and by storing the count value at a time point when the pixel is judged as a white spot noise pixel into the memory 110 in a manner similar to the case of the horizontal position information. Each of the counters 501 and 502 is reset every period. That is, the counter 501 is reset by an H reset pulse which is a pulse of the horizontal driving period. The counter 502 is reset by a V reset pulse which is a pulse of the vertical driving period.

Since the video signal has been interlace scanned, it is necessary to discriminate the presence or absence of a white spot noise from the information of two fields for the purpose of accuracy. In the embodiment, therefore, the presence or absence of a white spot noise is checked as mentioned above. It is also possible to check the data of a few fields and to detect a white spot noise from the average value. It is also possible to construct in a manner such that before checking the signal level of every pixel, the signals of all pixels of one horizontal line are added and a signal amount is compared every horizontal line, thereby specifying the line at which a white spot noise exists, and after that, a white spot noise is checked every one pixel with respect to such a defective line.

By the above operations, the storing process for storing the position information of all pixels in which white spot noises occur into the memory 110 is finished, so that the processing routine exits from a white spot noise pixel detecting loop (205). After that, the white spot noise correction circuit 107 changes the gain of the AGC circuit 105 to an ordinary gain (206). Further, an image display mode is set (207), thereby executing an ordinary image displaying process. Namely, the gain controls of the iris 102 and AGC circuit 105 are normally executed and, while performing a proper automatic exposure, the signal is read out from the solid state image pickup device 104 synchronously with the pulses which are generated from the sync signal generating circuit 103. The position information of the pixels which is being read out is sequentially continuously checked (208). When the position coincides with the position of the white spot noise pixel stored in the memory 110, the signal is corrected (209). The corrected signal is processed (210).

A method of correcting the signal will now be described hereinbelow with reference to FIGS. 6 to 8.

FIG. 6 shows a part of the color filters of the solid state image pickup device 104 shown in FIG. 3 as mentioned above. The signals are sequentially read out in accordance with the order from the left edge. It is now assumed that a defective pixel occurs in the pixel of the color filter $A_{12}$ and its position information has been stored in the memory 110. In the embodiment, a correcting method of replacing the signal of $A_{12}$ by the signal of $B_{11}$ is used as an example of a correcting method of the signal.

FIG. 7 is a block diagram showing a circuit for such a signal replacement. Such a circuit comprises a switch 701 and a D flip-flop (D·F/F) 702. The signal which is handled by the white spot noise correction circuit 107 is a digital signal and the signal of each pixel which is derived from the solid state image pickup device 104 is also processed by a plurality of bits. The white spot noise correction circuit 107 is provided for one of a plurality of bits.

FIGS. 8A to 8D are timing charts of the circuit block of FIG. 7. The D·F/F 702 performs a delay operation by a clock CK1 (FIG. 8A) of the same speed as the timing to read out the signal from the solid state image pickup device 104. When the clock input is stopped, the D·F/F 702 holds the output data in accordance with its characteristics. Therefore, by turning off the switch 701 by a control pulse (FIG. 8B), the clock CK1 is not supplied to the D·F/F 702 and the output data can be replaced with the data of the previous pixel. That is, by setting the control pulse to the low level in accordance with the position information stored in the memory 110, the data on $A_{12}$ having a white spot noise can be replaced by $B_{11}$. It will be obviously understood that when the clock CK1 is at the high level, the data is not replaced.

In the circuit of FIG. 7, the defective pixel is merely replaced by the information on the previous pixel. However, the defective pixel can be also replaced by the signal of the same color filter. A signal correcting method for this purpose will now be described hereinbelow with reference to FIGS. 9 to 11.

Figure 9:
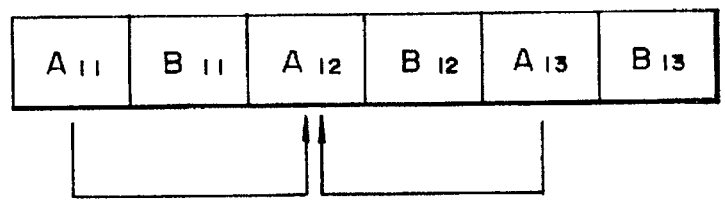
FIG. 9 is an explanatory diagram of an arrangement of color filters of a solid state image pickup device and the signal reading-out operation.

FIG. 9 shows a part of the color filters of the foregoing solid state image pickup device 104 shown in FIG. 3 in a manner similar to FIG. 6. The signals are sequentially read out in accordance with the order from the left edge. It is also assumed here that defective pixel also occurs in the pixel of the color filter $A_{12}$ and its position information has been stored in the memory 110.

Figure 10:
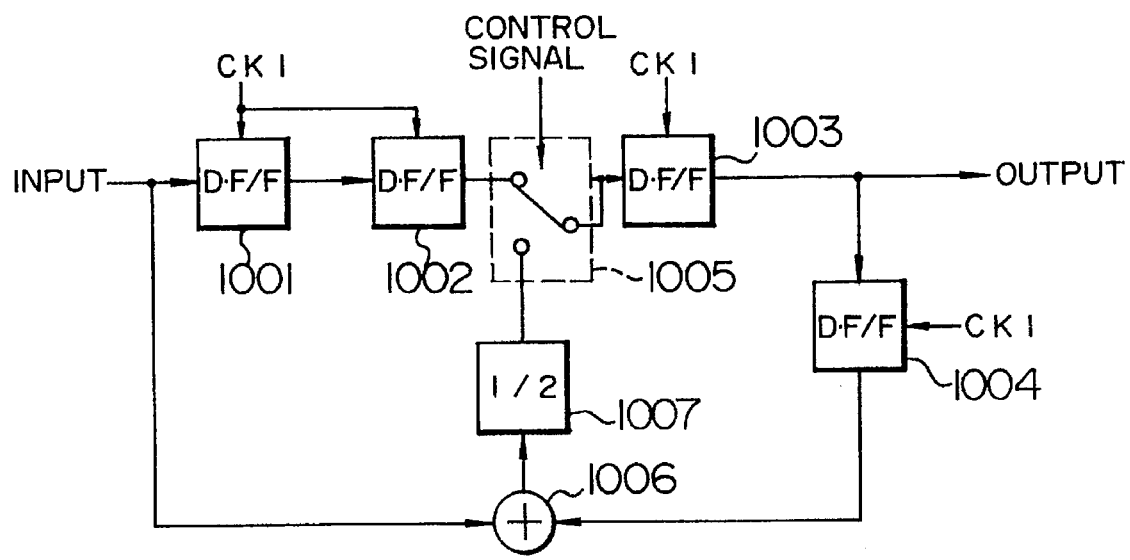
FIG. 10 is a block diagram of another circuit to perform a signal replacement for correction of a white spot noise in the first embodiment of the invention.

FIG. 10 is a block diagram showing another circuit for signal replacement. The circuit comprises: D flip-flops (D·F/F) 1001 to 1004 each for delaying the input data by the clock CK1; a change-over switch 1005; an adding circuit 1006; and a dividing circuit 1007 for reducing a data value into ½. According to the circuit, as a signal correcting method, when a defective pixel occurs in the pixel of the color filter $A_{12}$, the information of $A_{12}$ is replaced by the average value of the signals of $A_{11}$ and $A_{13}$.

FIGS. 11A to 11E show timing charts of the signals in FIG. 10. Since each of the D·F/F 1001 to 1004 delays the data synchronously with the clock CK1 (FIG. 11A), a timing of the input data (FIG. 11C) of the D·F/F 1001 and a timing of the output data (FIG. 11D) of the D·F/F 1004 are as shown in FIG. 11. In the circuit of FIG. 10, the change-over switch 1005 is switched to the dividing circuit 1007 side for a period of time during which the control pulse (FIG. 11B) is set to the high level on the basis of the white spot noise information in the memory 110. An input of the D·F/F 1003 is connected to an output of the dividing circuit 1007. Thus, the signal of $A_{12}$ is replaced with the average value of $A_{11}$ and $A_{13}$. Since the circuit corrects the white spot noise by the signal of the same color filter, the generation of a false color is suppressed.

According to the first embodiment as described above, a white spot noise is detected in a state in which the iris 102 is closed and the dark current as an output of the solid state image pickup device 104 is sufficiently amplified by the AGC circuit 105. Thus, the detection of a white spot noise and the correction based on it can be accurately executed by the video camera itself.

The second embodiment will now be described with reference to flowcharts of FIGS. 12 and 13. In the ordinary video camera, it is common sense in the power off state that the iris is closed so that the solid state image pickup device is not burnt by the light from the lens. In the ordinary video camera, therefore, the system including the iris is set into a predetermined state at the time of power-off and, after that, the power source is turned off. According to the second embodiment, therefore, a white spot noise is detected for a period of time during which the power source of the circuit is finally turned off after the iris was closed.

FIG. 12 is a flowchart of the white spot noise correction circuit 107 for detection of a white spot noise. When the operation to turn off the power switch is detected (1201), the white spot noise correction circuit 107 allows the iris 102 to be closed (1202) and increases the gain of the AGC circuit (1203). The white spot noise correction circuit 107 subsequently executes processes for detecting and storing the position information of all pixels having white spot noises of the solid state image pickup device 104 in steps 1204 to 1206 in a manner similar to steps 203 to 205 in FIG. 2 mentioned above. After that, the white spot noise correction circuit 107 returns the gain of the AGC circuit 105 to the normal mode (1207). The power source is turned off after that (1208).

FIG. 13 is a flowchart for white spot noise correction. Descriptions of processing steps 1301 to 1304 of the flow are omitted because those processes are similar to those in steps 207 to 210 in FIG. 2 mentioned above.

An object of the second embodiment is also to accurately detect a white spot noise by closing the iris and increasing the gain of the AGC circuit in a manner similar to the first embodiment. According to the second embodiment, when the power source is turned on, the position information on the white spot noise has already been stored in the memory and the correction of the white spot noise is executed on the basis of the position information stored. Therefore, a time which is required until a picture image is actually displayed after the turn-on of the power source can be reduced from that in the first embodiment. According to the second embodiment, since a white spot noise is detected in a state in which each section of the video camera is sufficiently warmed and the circuit system and the like are stabilized, a detection precision of a white spot noise is further raised. In the second embodiment, the memory 110 to store the white spot noise position information needs to be backed up by a sub-battery or the like different from a main power source battery even when the main power source is shut off. In both of the first and second embodiments, the contents in the memory 110 are reset before the white spot noise is detected.

The third embodiment will now be described with reference to FIGS. 14 and 15. In the third embodiment, a white spot noise is detected in a state in which the iris is completely opened and the gain of the circuit system is raised. The third embodiment intends to detect and correct a white spot noise even in a state in which an object is actually being photographed. Although the third embodiment can be solely constructed, it is desirable to combine it with the first or second embodiment.

FIG. 14 shows a block diagram of a main section of the video camera according to the second embodiment. The video camera comprises: a lens 1401; an iris 1402; a sync signal generating circuit 1403; a solid state image pickup device 1404; an AGC circuit 1405; an A/D converting circuit 1406; a white spot noise correction circuit 1407; a signal processing circuit 1408; a D/A converting circuit 1409; a memory 1410; and a temperature detecting circuit 1411. A description of a series of signal processes of the sync signal generating circuit 1403, solid state image pickup device 1404, AGC circuit 1405, A/D converter 1406, signal processing circuit 1408, D/A converter 1409, and memory 1410 is omitted because it is similar to that of the video camera shown in FIG. 1.

Figure 15:
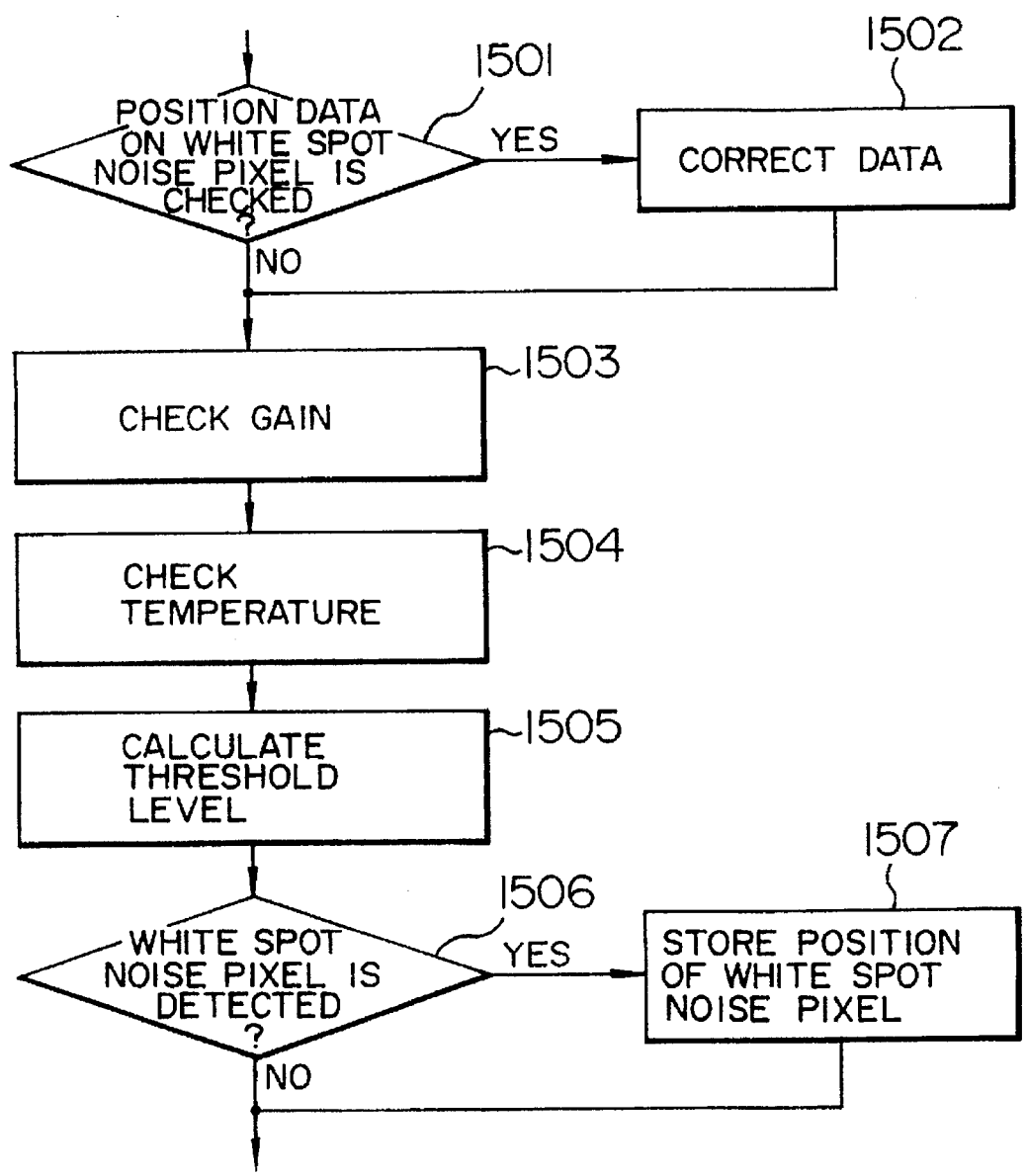
FIG. 15 is a flowchart showing a flow of a white spot noise detecting process according to the third embodiment of the invention.

FIG. 15 shows an operation flow of the white spot noise correction circuit 1407. First, the white spot noise correction circuit 1407 checks the white spot noise position information which has already been written in the memory 1410 (1501). When there is white spot noise position information, the white spot noise is corrected on the basis of the position information (1502). After that, the white spot noise correction circuit 1407 obtains the AGC gain data from the AGC circuit 1405 (1503) and further obtains the data of a temperature of the solid state image pickup device 1404 or its peripheral temperature from the temperature detecting circuit 1411 (1504). A threshold level of the white spot noise is calculated (1505). The threshold level is calculated by arithmetic operations such that when the gain of the AGC circuit is doubled, the threshold level is also doubled, and when the gain of the AGC circuit is reduced into ½, the threshold level is also decreased into ½, and on the other hand, when the temperature is raised by 10° C., the threshold level is doubled and, when the temperature decreases by 10° C., the threshold level is reduced into ½. The white spot noise correction circuit 1407 checks the white spot noise pixel by using the calculated threshold level (1506). The position information on the pixel which was determined to be a pixel having a white spot noise is newly written into the memory 1410 (1507). A sudden large signal of only one pixel is judged as a white spot noise and the detected white spot noise is corrected within the next frame. The processing orders of the white spot noise detecting process and correcting process can be also reversed.

A problem which occurs when the white spot noise is corrected in the ordinary photographing state relates to at which accuracy the white spot noise signal is discriminated.

That is, it is important to correctly determine whether the large signal obtained is caused by the photosignal which enters the solid state image pickup device 1404 or by the white spot noise. As mentioned above, by allowing the threshold level to be adapted to the temperature of the solid state image pickup device 1404 or to the operating state of the AGC circuit and by regarding the sudden large signal of only one pixel as a white spot noise, an enough effect can be obtained. However, by adding a process to again discriminate whether the pixel which was judged as a white spot noise continues for a predetermined time or the signal is a large signal which can be also regarded as a white spot noise even after the elapse of the predetermined time, the detection precision of the white spot noise can be further improved.

Figure 16:
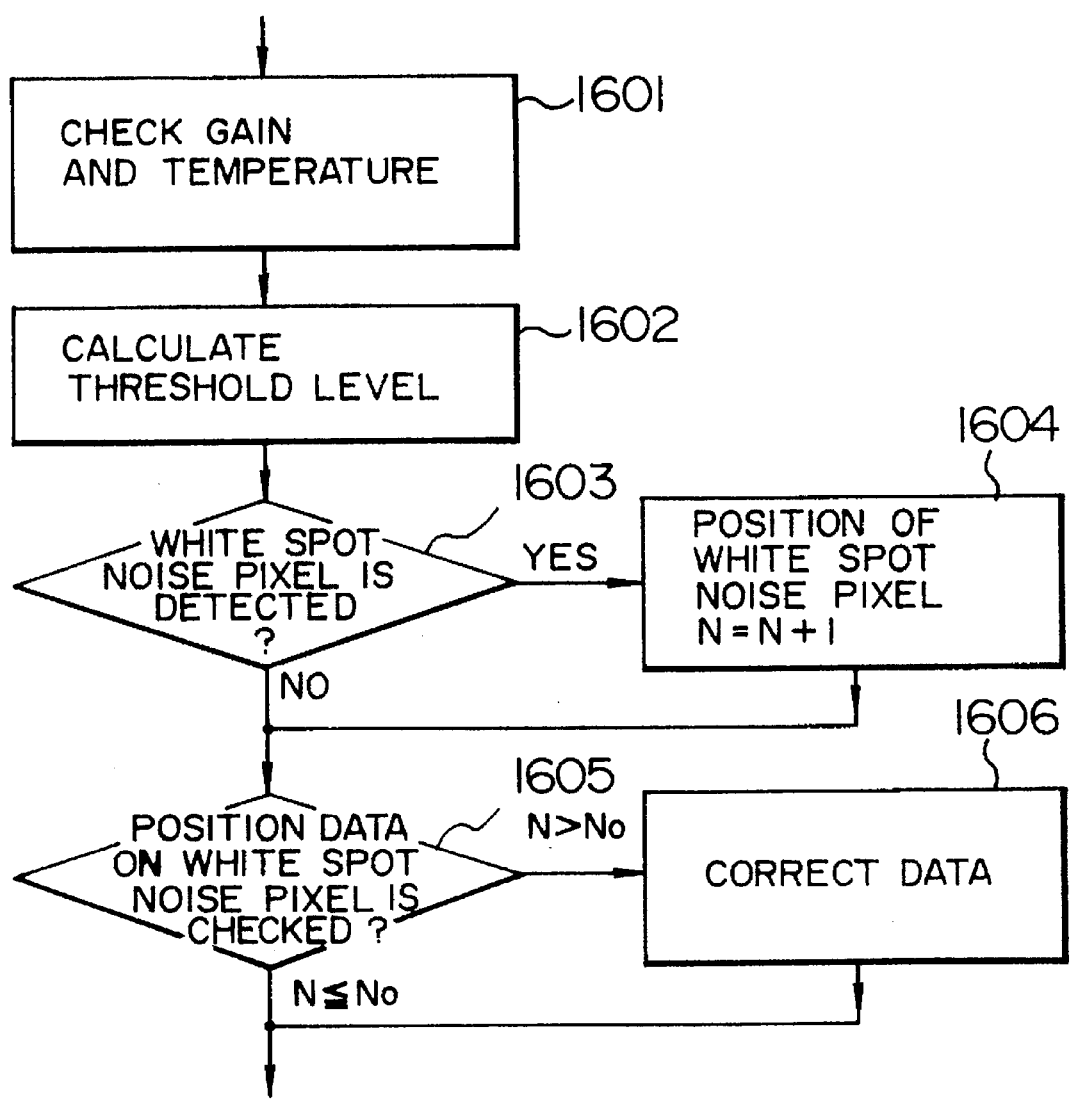
FIG. 16 is a flowchart showing flows of a white spot noise detecting process and a white spot noise judging process according to the third embodiment of the invention.

FIG. 16 shows a processing flow for executing the checking operations a plurality of times. In a manner similar to the flow of FIG. 15, the white spot noise correction circuit 1407 checks the gain and temperature (1601), calculates the threshold level (1602), and detects the white spot noise pixel (1603). Further, in the case where the white spot noise pixel is detected, the white spot noise correction circuit 1407 records the white spot noise and the number N of detection times into the memory 1410 with respect to each pixel (1604). When the number of detection times of the white spot noise reaches a predetermined number of times $N_0$ or more with regard to the same pixel, namely, when $N>N_0$ (1605), the correction is executed for the first time (1606). According to the flow, since the correction is executed when the number of detection times of the white spot noise reaches the predetermined plural number $N_0$ or more, the detection precision of the white spot noise is further improved. The recorded number N of detection times is reset when the power source is turned on.

Although the present invention has been described above with respect to the preferred embodiments, many various modifications are possible within the scope of the claims of the invention without departing from the spirit and idea of the present invention. It will be also obviously understood that the invention can be embodied by combining the above embodiments.

What is claimed is:

1. A video camera comprising:

a lens system for forming an image from an incident light;

a solid state image pickup device for converting the image of an object formed by said lens system into an electric signal corresponding to a plurality of pixels;

a light shielding means for shielding the incident light to said solid state image pickup device;

a detecting means for comparing an output signal of each pixel of the solid state image pickup device and a predetermined level, thereby detecting defective pixels of the solid state image pickup device;

a means for controlling said light shielding means so as to shield the incident light to said solid state image pickup device when said detecting means detects defective pixels;

an automatic gain control circuit amplifying an output of said solid state image pickup device with an object imaging gain within an object imaging gain range for keeping a brightness of the image constant during times when the image of said object is formed, and with a defective pixel detecting gain during times when said detecting means detects said defective pixels, wherein said defective pixel detecting gain has a gain level which is higher than a highest gain level of said object imaging gain range;

a means for raising a gain of said automatic gain control circuit to said defective pixel detecting gain during times when said detecting means detects said defective pixels;

a memory for storing position information on said defective pixels detected by said detecting means; and a replacing means for replacing a signal of a defective pixel of said defective pixels, which is specified by said position information in said memory by a signal formed based on a signal of a peripheral pixel of said defective pixel, wherein said detecting means detects said defective pixels in a state in which the incident light is shielded by said light shielding means.

2. A video camera according to claim 1, wherein the signal formed based on the signal of the peripheral pixel of said defective pixel is a signal of a pixel adjacent to said defective pixel.

3. A video camera according to claim 1, wherein the peripheral pixel of said defective pixel is a pixel existing at a nearest position from among pixels having color filters of a same color as that of a color filter of said defective pixel.

4. A video camera according to claim 1, wherein the detection of said defective pixels by said detecting means and the light shielding of the incident light by said light shielding means are automatically executed after a power source is turned on.

5. A video camera according to claim 1, wherein the detection of said defective pixels by said detecting means and the light shielding of the incident light by said light shielding means are automatically executed when an operation to shut off a power source is performed.

6. A method of correcting a defect of a signal which is output for a plurality of pixels from a solid state image pickup device, comprising the steps of:

shielding an incident light to said solid state image pickup device by a light shielding means;

using an automatic gain control circuit to amplify an output of said solid state image pickup device with a an object imaging gain within an object imaging gain range for keeping a brightness of the image constant during times when the image of said object is formed, and with a defective pixel detecting gain during times when defective pixels are detected, wherein said defective pixel detecting gain has a gain level which is higher than a highest gain level of said object imaging gain range;

detecting said defective pixels of the solid state image pickup device while said automatic gain control circuit amplifies said output with said defective pixel detecting gain by comparing an output signal of each pixel of said solid state image pickup device and a predetermined level;

storing position information on said defective pixels detected by said detecting step;

opening said light shielding means; and replacing a signal of the defective pixel which is specified by said position information stored by a signal formed based on a signal of a peripheral pixel of said defective pixel.

7. A method according to claim 6, wherein the signal formed based on the signal of the peripheral pixel of said defective pixel is a signal of a pixel adjacent to said defective pixel.

8. A method according to claim 6, wherein the peripheral pixel of said defective pixel is a pixel existing at a nearest position from among pixels having color filters of a same color as that of a color filter of said defective pixel.

9. A method according to claim 6, wherein the light shielding of said incident light is automatically executed after a power source is turned on.

10. A method according to claim 6, wherein the light shielding of said incident light is automatically executed when an operation to shut off a power source is performed, and the opening of said light shielding means is automatically executed after the power source is turned on.

11. A video camera according to claim 6, wherein the detection of said defective pixels by said detecting step and the light shielding of the incident light by said light shielding means are automatically executed when an operation to shut off a power source is performed.

12. A method of correcting a defect of a signal which is output for a plurality of pixels from a solid state image pickup device, comprising the steps of:

multiplying a predetermined reference value by a coefficient corresponding to a value of a gain of an automatic gain control circuit for amplifying an output of said solid state image pickup device so as to keep a brightness of an image constant to obtain a reference level;

detecting defective pixels of the solid state image pickup device by comparing an output signal of each pixel of the solid state image pickup device which was amplified by said automatic gain control circuit and said reference level;

storing position information for ones of said defective pixels which, for a predetermined number of occurrences, satisfy a criterion that an output signal of a pixel corresponding to a defective pixel is greater than said reference level and output signal levels of pixels located before and after a defective pixel are not greater than said reference level; and replacing the signal of the defective pixel which is specified by the position information stored by a signal formed based on a signal of a peripheral pixel of said defective pixel.

13. A method according to claim 11, wherein when the gain of said automatic gain control circuit is doubled, said reference level is substantially doubled and, when the gain of the automatic gain control circuit is reduced into ½, said reference level is decreased into substantially ½.

14. A method according to claim 11, wherein the signal formed based on the signal of the peripheral pixel of said defective pixel is a signal of the pixel adjacent to said defective pixel.

15. A method according to claim 12, wherein the peripheral pixel of said defective pixel is a pixel existing at a nearest position from among pixels having color filters of a same color as that of a color filter of said defective pixel.

* * * * *